United States Patent [19]
Rauch et al.

[11] 3,821,300
[45] June 28, 1974

[54] CATALYTIC HYDRATION OF NITRILES TO PRODUCE AMIDES

[75] Inventors: Francis Clyde Rauch; Guenter Willi Nachtigall, both of Stamford, Conn.

[73] Assignee: American Cyanamid Company, Stamford, Conn.

[22] Filed: June 2, 1972

[21] Appl. No.: 259,172

Related U.S. Application Data

[63] Continuation-in-part of Ser. No. 094,196, Dec. 1, 1970, Pat. No. 3,673,250.

[52] U.S. Cl. .......................... 260/561 N, 260/561 R
[51] Int. Cl. ............................................. C07c 103/00
[58] Field of Search ................................. 260/561 N

[56] References Cited
UNITED STATES PATENTS
3,673,250  6/1972  Rauch et al.................... 260/561 N

*Primary Examiner*—Lewis Gotts
*Assistant Examiner*—Ethel G. Love
*Attorney, Agent, or Firm*—Gordon L. Hart

[57] ABSTRACT

A homogeneous catalyst system for catalytic hydration of nitriles with water to make the corresponding amide is described. The catalyst employs a diaryl or dialkyl phosphite in the solution of water and nitrile with a compound of a transition metal that is capable of forming a coordination complex with the phosphite. In specific embodiments diethyl or diphenyl phosphite and rhodium trichloride are used in a solution of acrylonitrile and water for catalytic hydration of the acrylonitrile to make acrylamide. Also described are similar catalyst systems and processes employing dialkyl or diaryl sulfites instead of the phosphite catalyst components.

10 Claims, No Drawings

CATALYTIC HYDRATION OF NITRILES TO PRODUCE AMIDES

This is a continuation-in-part of the copending Application Ser. No. 094,196, filed Dec. 1, 1970 by the same inventors, now U.S. Pat. No. 3,673,250. The entire specification of that application is incorporated herein by reference.

The invention relates to catalytic hydration of a nitrile with water to produce the corresponding amide, such as acrylamide from acrylonitrile. In our copending application, mentioned above, there is described the hydration of a selected nitrile in a liquid solution which also comprises water and a homogeneous catalyst which comprises an organic phosphine, organic phosphite, or the like and a compound of a transition metal that is capable of forming a coordination complex with the phosphine or phosphite such as rhodium trichloride and the like. The most preferred specific catalyst combination of the generic class previously described had been a triaryl or trialkyl phosphine, e.g., triphenylphosphine, triethylphosphine, etc., with a rhodium compound e.g., rhodium trichloride, etc. Such embodiments were described in several examples of the same copending application.

Since filing the earlier application and in working further with other embodiments of the generic invention, it has now been discovered that dialkyl and diaryl phosphites seem to be among the most preferred of the organic phosphines and phosphites, for use with rhodium or other transition metal compounds in a catalyst system of the class described and claimed in the earlier copending application. It is found in the catalytic hydration of nitriles, using such a catalyst system with either dialkyl or diaryl phosphites, that the optimum ratio of organic phosphite to transition metal in the catalyst system is higher than the optimum ratios that were found when trialkyl or triaryl phosphines or phosphites were used instead. Also, the usual yield of amide per hour per mole of transition metal in the system is found to be considerably higher in a nitrile hydration process using a dialkyl or diaryl phosphite, than the usual yields obtained when using the other organic phosphites or phosphines that we have actually used. This is a very important economic advantage because some of the preferred transition metals, and particularly rhodium which is the most preferred, are scarce and consequently very expensive.

Reference is made to the earlier copending application Ser. No. 094,196 for more detailed description of typical yields per hour per mole of rhodium in several of the systems employing trialkyl and triaryl phosphines and phosphites. The highest yield per hour per mole of rhodium described in the copending application was 7.5 moles/hr/mole catalyst, obtained with trialkyl and triaryl phosphites.

Also, reference is made to the same earlier copending application for more detailed description of the class of transition metal compounds and particularly of rhodium compounds that can be used as catalyst components. The earlier copending application also describes in more detail the broad class of organic nitriles that can be hydrated by the process of the invention. Those descriptions apply the same with regard to the present invention.

EXAMPLE 1

A solution was prepared using 0.2 millimole (m mole) $Rh(AN)_3Cl_3$ complex, 0.4 m mole diethyl phosphite (molar ratio 2 phosphite: 1 Rh), 0.2 m mole 2,5-dinitrophenol as polymerization inhibitor, and 0.15 ml (8.3 m moles) water in 10.0 ml (152 m moles) acrylonitrile.

The $Rh(AN)_3Cl_3$ complex is a complex of acrylonitrile (AN) and rhodium trichloride ($RhCl_3$). The complex had been previously prepared by dissolution of $RhCl_3$ hydrate in acrylonitrile followed by precipitation of the $Rh(AN)_3Cl_3$ complex with diethyl ether. The yellow solid thus formed was filtered, dried by air suction for 1 hour and vacuum pumping for 1 hour. The 2,5-dinitrophenol was incorporated to prevent polymerization reactions of the acrylonitrile or the acrylamide formed.

The reaction solution was heated for a period of 38.8 hours at 70° ± 0.3°C. During this period 0.6 ml. (33 m moles) of additional water was added in 0.2 ml. increments as needed. During the initial 8 hours of reaction the rate of acrylamide (AMD) formation steadily increased, reaching a value of 0.9 mole per liter-hour (9.5 mole AMD/mole Rh/hr). Acrylamide formation proceeded at this rate for an additional 30.8 hours when the reaction was terminated by quenching at 25°C. The final solution contained 31% acrylamide by weight.

EXAMPLE 2

The procedure of Example 1 was followed except that 0.6 m moles of diethylphosphite was used (3 Phosphite: 1 Rh). The rate of reaction was found to be 0.30 mole AMD/liter/hr. (15 mole AMD/mole Rh/hr), or approximately 1.5 times the rate in Example 1.

EXAMPLE 3

The procedure of Example 1 was followed except that 0.8 m moles of diethylphosphite was used (4 Phosphite: 1 Rh). A rate of 0.34 mole AMD/l/hr (17 mole AMD/mole Rh/hr) was observed, an increase of about 1.8 over the rate in Example 1.

EXAMPLE 4

A rhodium-propionitrile complex, $RhCl_3 (C_2H_5CN)_3$, was prepared according to the procedure of B. F. G. Johnson and R. A. Walton, *J. Inorg. Nucl. Chem.* 28, pp. 1901–1905 (1966).

A solution was prepared from 0.2 m mole of $RhCl_3 (C_2H_5CN)_3$, 0.3 m mole diethyl phosphite (1.5 Phosphite: 1 Rh), 0.2 m mole, 2,5-dinitrophenol (as polymerization inhibitor), and 0.4 ml. (22 m mole) of water in 10.0 ml. (152 m mole) of acrylonitrile. The solution was heated at 70°–71° for a period of 72 hours, in the course of which an additional 1.3 ml. (72 m mole) of water was added to the solution. After an induction period of several hours, the formation of acrylamide proceeded at a rate of 0.21 moles per liter per hour (10.5 moles acrylamide/mole Rh/hr).

EXAMPLE 5

The procedure of Example 4 was followed, except that 0.3 m mole of di(n-octadecyl) phosphite was used in place of the diethyl phosphite (1.5 phosphite: 1 Rh). The formation of acrylamide proceeded, after an induction period of several hours, at a rate of 0.15 moles per liter per hour (7.5 moles AMD/mole Rh/hr).

Any suitable diaryl or dialkyl phosphite that can be solubilized with the other components of the reaction solution can be used. Useful diaryl phosphites include diphenyl, di-p-tolyl, di-anisyl, di-p-chlorophenyl, di-p-bromophenyl, di-p-trifluormethyl phenyl, dinapthyl and the like. Useful dialkyl phosphine oxides include dimethyl, diethyl, di-isopropyl, di-n-butyl, di-isopentyl, dihexyl, di-n-octadecyl and the like, as well as mixed dialkyl phosphites, such as methyl ethyl, methyl isopropyl, ethyl hexyl and the like.

EXAMPLE 6

A solution was prepared using 0.2 m moles $RhCl_3$ trihydrate and 0.3 m moles diphenylphosphite in 10.0 ml. (152 m moles) of acrylonitrile. The solution was heated at 70°–71°C. for 19 hours before 0.2 ml. (11 m moles) of water was added to start the reaction. For the first 6 hours, acrylamide formation proceeded at a rate of 0.1 moles perliter per hour (5 moles of acrylamide per mole of Rh per hour) and continued for 35 hours at a rate of 0.059 moles per liter per hour (3 moles acrylamide/mole Rh/hr), during which an additional 0.4 ml. (22 m moles) of water was added.

EXAMPLE 7

The procedure of Example 4 was followed except that the experiment was scaled up 40 times, using 8 m moles $RhCl_3$ ($AN_3$), 12 m moles diethyl phosphite, 400 ml. (6.1 moles) acrylonitrile and 30 ml. (1.67 moles) of water. After an induction period of several hours acrylamide formation proceeded at a rate of 0.211 moles per liter per hour (10.5 moles acrylamide/mole Rh/hr).

Instead of adding diaryl or dialkyl phosphite directly to the solution as in the foregoing examples, one may instead add a precursor which will hydrolyze to provide the disubstituted phosphite in solution. For example dialkyl or diaryl chlorophosphite, $(RO)_2PCl$, when added to the aqueous reaction solution, will be very rapidly hydrolyzed to provide the active dialkyl or diaryl phosphite

in the solution.

Furthermore, in connection with the new discoveries using diaryl or dialkyl phosphites, it has also been discovered that diaryl sulfite and dialkyl sulfites can be used in catalytic combination with a transition metal compound for the hydration of nitriles, the same as the organic phosphines or phosphites which had been previously described for such use. Catalyst systems with organic sulfites will not usually have as high activity as those with organic phosphines or phosphites. Nevertheless, those sulfite systems exhibit useful catalytic activity for nitrile hydration.

EXAMPLE 8

A reaction solution was prepared as in Example 1 except 1.75 m mole of dimethyl sulfite was substituted for the 0.4 m mole diethyl phosphite, (9.2 dimethyl sulfite: 1 Rh). The mixture was heated at 70°–71°C. for 70 hours. Formation of acrylamide proceeded without appreciable induction period at 0.5 moles/liter/hr. (2.5 Moles/AMD mole/Rh/hr) over the 70 hour period. At a reduced concentration of dimethyl sulfite, i.e. 0.3 moles (3 dimethyl sulfite: 2 Rh) in a corresponding reaction run for 24 hours, the conversion rate was about one-tenth the rate with 1.75 m mole.

We claim:

1. In a process for producing acrylamide by catalytic hydration of acrylonitrile which comprises reacting water and the selected nitrile in liquid solution with a homogeneous catalyst which comprises an organic phosphite and a rhodium compound capable of forming a coordination complex with said organic phosphite, the improvement wherein the organic phosphite component of said homogeneous catalyst is selected from the group consisting of diaryl and dialkyl phosphites.

2. An improved process defined by claim 1 wherein the selected transition metal compound is rhodium trichloride.

3. An improved process defined by claim 1 wherein the selected organic phosphite component is diethyl phosphite.

4. An improved process defined by claim 3 wherein the selected rhodium compound is rhodium trichloride.

5. An improved process defined by claim 1 wherein the organic phosphite compound is diphenyl phosphite.

6. An improved process defined by claim 1 wherein the organic phosphite component is di(n-octadecyl) phosphite.

7. An improved process defined by claim 5 wherein the selected transition metal compound is rhodium trichloride.

8. An improved process defined by claim 6 wherein the selected transition metal compound is rhodium trichloride.

9. A process for producing acrylamide by catalytic hydration of acrylonitrile which comprises reacting water and the selected nitrile in liquid solution with a homogeneous catalyst which comprises a dialkyl sulfite and a rhodium compound capable of forming a coordination complex with said dialkyl sulfite.

10. A process defined by claim 9 wherein the selected sulfite is dimethyl sulfite.

* * * * *